United States Patent
Morita

(10) Patent No.: US 7,741,871 B2
(45) Date of Patent: Jun. 22, 2010

(54) INTEGRATED CIRCUIT DEVICE, ELECTRO-OPTICAL DEVICE, AND ELECTRONIC INSTRUMENT

(75) Inventor: Akira Morita, Simosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/404,806

(22) Filed: Mar. 16, 2009

(65) Prior Publication Data

US 2009/0237174 A1    Sep. 24, 2009

(30) Foreign Application Priority Data

Mar. 19, 2008 (JP) ............................ 2008-070764
Mar. 19, 2008 (JP) ............................ 2008-070765

(51) Int. Cl.
*H03K 19/0175* (2006.01)

(52) U.S. Cl. ...................... 326/82; 326/83; 326/86; 326/87; 327/108; 327/109

(58) Field of Classification Search ............ 326/82–87; 327/108, 109
See application file for complete search history.

(56) References Cited

U.S. PATENT DOCUMENTS

| 6,670,830 B2 | 12/2003 | Otsuka et al. |
| 7,050,032 B2 | 5/2006 | Tamura |
| 7,339,443 B2 | 3/2008 | Fusayasu et al. |
| 7,432,732 B2 * | 10/2008 | Komatsu et al. .............. 326/37 |
| 2005/0068286 A1 | 3/2005 | Morita |

FOREIGN PATENT DOCUMENTS

| JP | A-10-79653 | 3/1998 |
| JP | A-11-95713 | 4/1999 |
| JP | A-2001-7458 | 1/2001 |
| JP | A-2001-211211 | 8/2001 |
| JP | A-2001-222249 | 8/2001 |
| JP | A-2006-191544 | 7/2006 |
| JP | A-2008-225494 | 9/2008 |

* cited by examiner

*Primary Examiner*—James H. Cho
*Assistant Examiner*—Thienvu V Tran
(74) *Attorney, Agent, or Firm*—Oliff & Berridge, PLC

(57) ABSTRACT

An integrated circuit device includes a high-speed serial interface circuit that includes a receiver circuit that receives differential signals through a serial bus, first and second guard terminals that prevent radiation, first and second terminals that are disposed between the first and second guard terminals and receive the differential signals, a first power supply terminal to which a high-voltage-side power supply voltage for the receiver circuit is supplied, and a second power supply terminal to which a low-voltage-side power supply voltage is supplied. A first switch element is provided between a line from the first guard terminal and a line from the second power supply terminal, and a second switch element is provided between a line from the second guard terminal and a line from the second power supply terminal. The first and second switch elements are turned ON in a high-speed serial interface mode.

18 Claims, 13 Drawing Sheets

FIG. 3A HIGH-SPEED SERIAL INTERFACE MODE
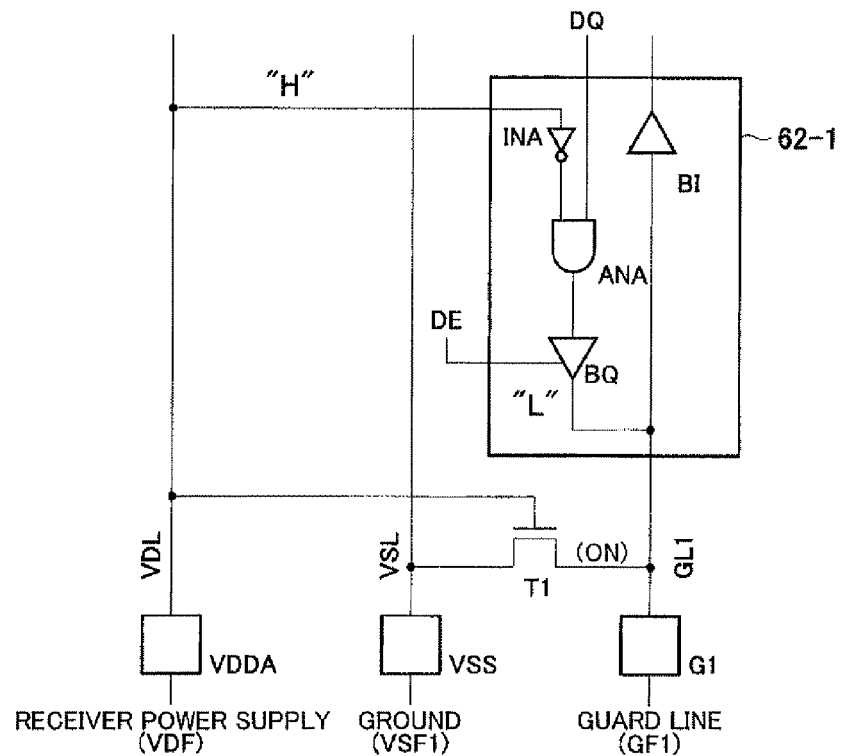
FIG. 3B PARALLEL INTERFACE MODE
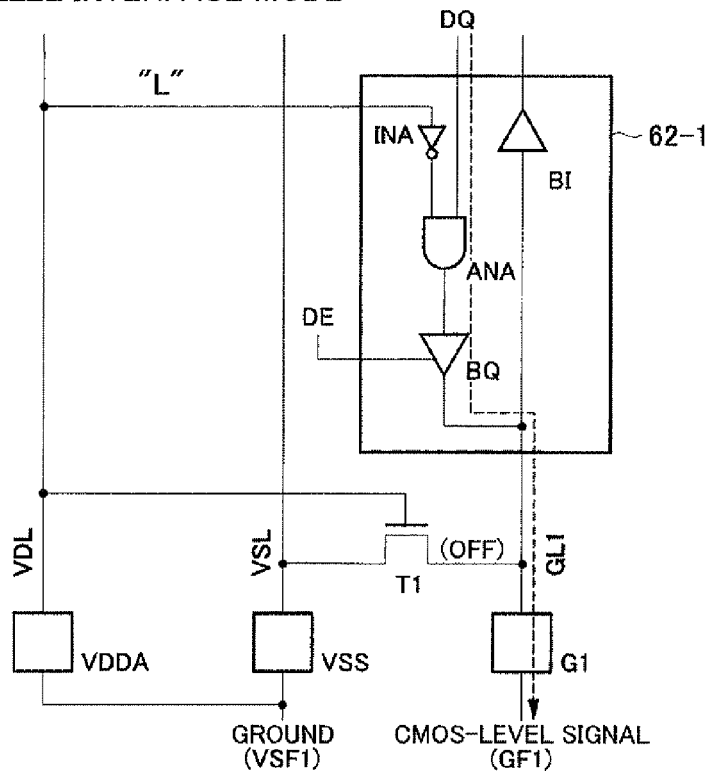

FIG. 6A  HIGH-SPEED SERIAL INTERFACE MODE
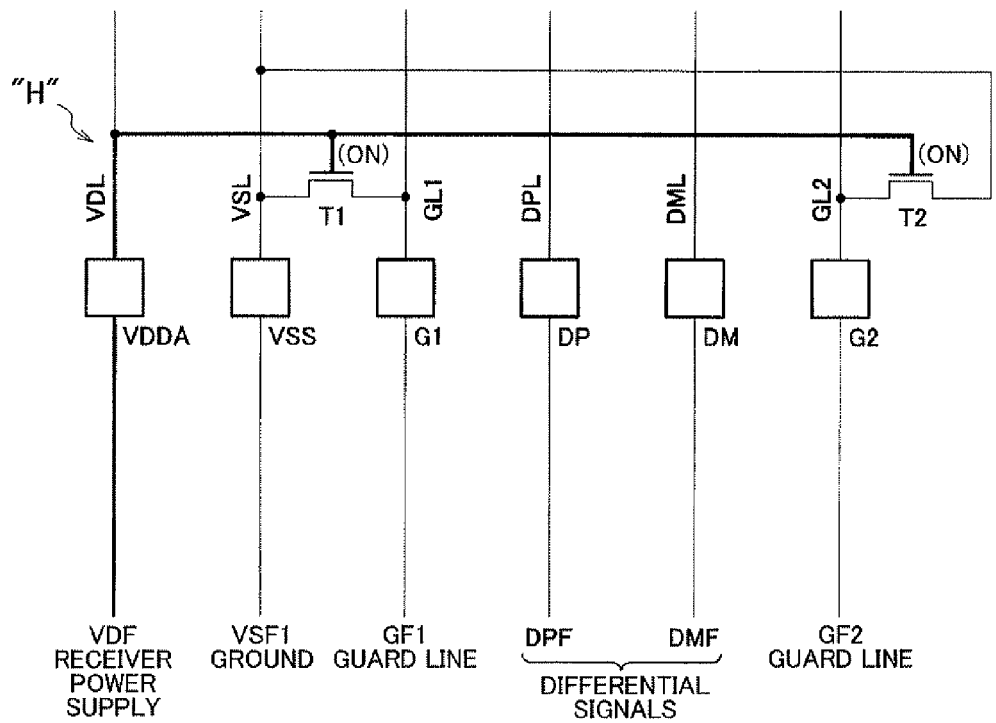
FIG. 6B  PARALLEL INTERFACE MODE
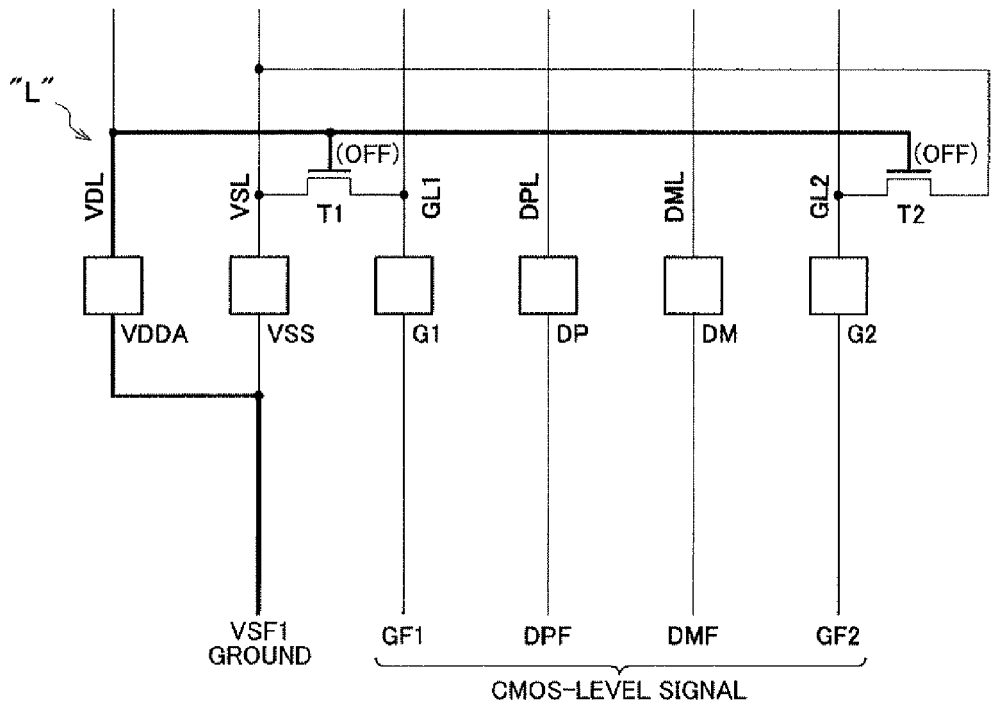

CHARACTERISTIC IMPEDANCE

FIG. 8A GCD
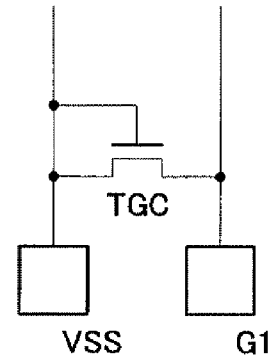
FIG. 8B PARALLEL INTERFACE MODE
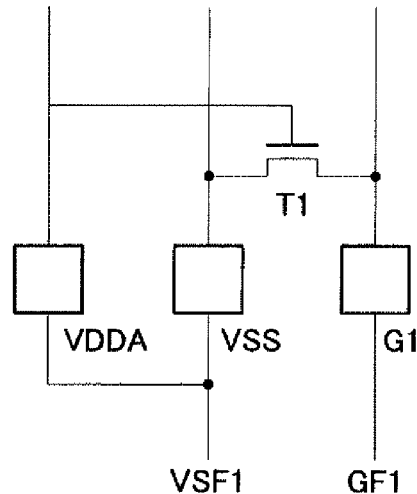
FIG. 8C HIGH-SPEED SERIAL INTERFACE MODE
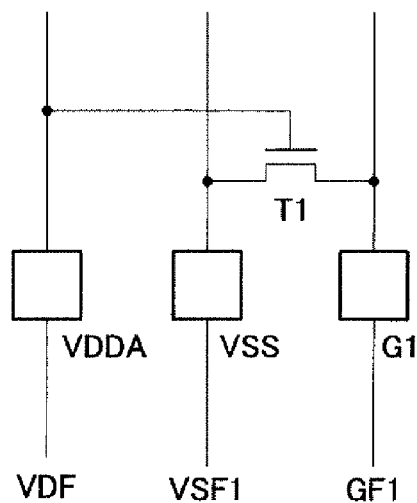

FIG. 9A  HIGH-SPEED SERIAL INTERFACE MODE
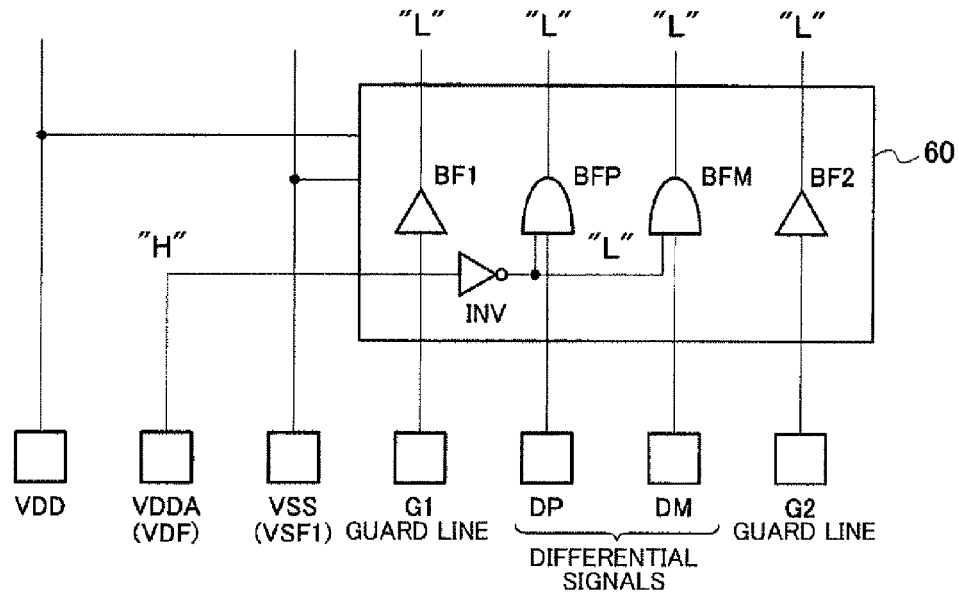
FIG. 9B  PARALLEL INTERFACE MODE
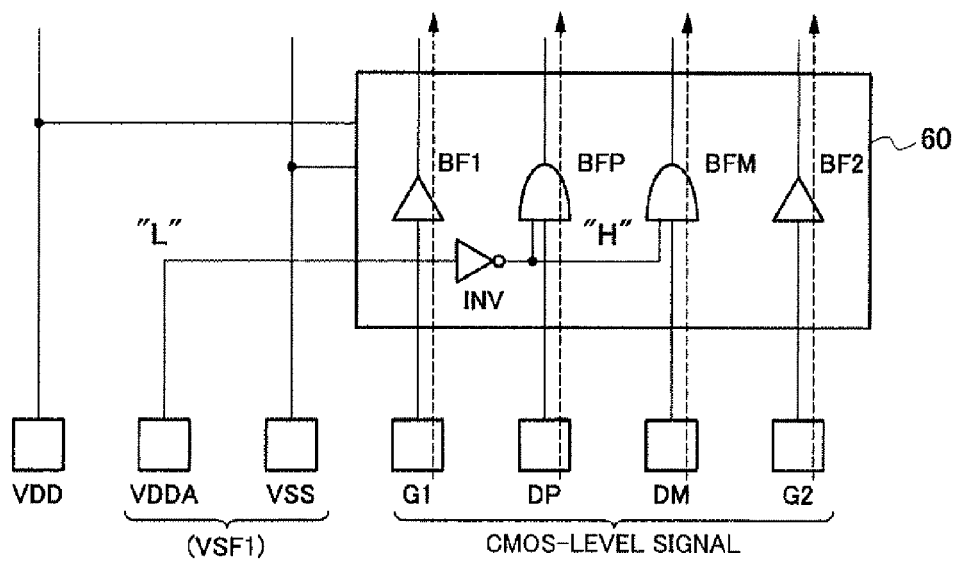

INTEGRATED CIRCUIT DEVICE, ELECTRO-OPTICAL DEVICE, AND ELECTRONIC INSTRUMENT

Japanese Patent Application No. 2008-70764 filed on Mar. 19, 2008 and Japanese Patent Application No. 2008-70765 filed on Mar. 19, 2008, are hereby incorporated by reference in their entirety.

BACKGROUND

The present invention relates to an integrated circuit device, an electro-optical device, an electronic instrument, and the like.

In recent years, a high-speed serial interface such as low-voltage differential signaling (LVDS) has attracted attention as communication means between LSIs. In such a high-speed serial transfer, a transmitter circuit transmits serialized data using differential signals, and a receiver circuit differentially amplifies the differential signals to implement data transfer.

A projector (projection-type display device) generally includes a circuit board section that performs display image processing and the like, and an optical system section that is provided with a liquid crystal panel (electro-optical panel), a light source, a lens, and the like. Image data is transmitted from the circuit board section by a host processor, and a display driver (driver) provided in the optical system section receives the image data and drives the liquid crystal panel. A high-speed communication that deals with high-definition image display can be performed by utilizing the high-speed serial interface for such a data transfer.

However, since the high-speed serial interface implements a high-speed data transfer using the differential signals, undesirable electromagnetic radiation (EMI noise) is generated from the serial bus. In particular, undesirable electromagnetic radiation occurs to a large extent between separated sections (e.g., circuit board and optical system) since the transmitter side is positioned away from the receiver side.

A display driver generally utilizes a microprocessor unit (MPU) interface (i.e., MPU parallel interface) as an interface between the display driver and a host processor. Therefore, a high-speed serial interface circuit and an MPU parallel interface circuit may be integrated in the display driver. In this case, cost can be reduced by allowing each interface circuit to share each terminal. However, it is difficult to switch the interface while suppressing undesirable electromagnetic radiation generated from the serial bus. Moreover, since the function of each terminal differs corresponding to the interface, it is difficult to share each terminal.

SUMMARY

According to one aspect of the invention, there is provided an integrated circuit device comprising:

a high-speed serial interface circuit that includes a receiver circuit that receives differential signals through a serial bus;

a first guard terminal that prevents radiation;

a second guard terminal that prevents radiation;

a first terminal that is disposed between the first guard terminal and the second guard terminal and receives a first signal of the differential signals;

a second terminal that is disposed between the first guard terminal and the second guard terminal and receives a second signal of the differential signals;

a first power supply terminal, a high-voltage-side power supply voltage of the receiver circuit being supplied to the firs t power supply terminal; and a second power supply terminal, a low-voltage-side power supply voltage being supplied to the second power supply terminal, a first switch element being provided between a line from the first guard terminal and a line from the second power supply terminal, and a second switch element being provided between a line from the second guard terminal and a line from the second power supply terminal, the first switch element and the second switch element being turned ON in a high-speed serial interface mode.

According to another aspect of the invention, there is provided an integrated circuit device comprising:

a high-speed serial interface circuit that includes a receiver circuit that receives differential signals through a serial bus;

a first guard terminal that prevents radiation;

a second guard terminal that prevents radiation;

a first terminal that is disposed between the first guard terminal and the second guard terminal and receives a first signal of the differential signals;

a second terminal that is disposed between the first guard terminal and the second guard terminal and receives a second signal of the differential signals;

a first power supply terminal, a high-voltage-side power supply voltage of the receiver circuit being supplied to the first power supply terminal;

a second power supply terminal, a low-voltage-side power supply voltage being supplied to the second power supply terminal;

a first switch element provided between a line from the first guard terminal and a line from the second power supply terminal;

a second switch element provided between a line from the second guard terminal and a line from the second power supply terminal;

a first I/O buffer that receives and outputs a parallel interface signal through the first guard terminal; and a second I/O buffer that receives and outputs a parallel interface signal through the second guard terminal, the first switch element and the second switch element being turned ON and outputs of the first I/O buffer and the second I/O buffer being set at a low-voltage-side level or set in a high impedance state in a high-speed serial interface mode.

According to another aspect of the invention, there is provided an electro-optical device comprising:

the above integrated circuit device;

an electro-optical panel; and a circuit board, the circuit board including a first line connected to the first terminal, a second line connected to the second terminal, a first guard line connected to the first guard terminal, a second guard line connected to the second guard terminal, a first power supply line connected to the first power supply terminal, and a second power supply line connected to the second power supply terminal, the first line and the second line being provided between the first guard line and the second guard line.

According to another aspect of the invention, there is provided an electronic instrument comprising the above electro-optical device.

BRIEF DESCRIPTION OF THE DRAWINGS

FIGS. 3A and 3B show a first configuration example of an I/O buffer.

FIGS. 6A and 6B are views illustrative of the operation of a transistor.

FIGS. 8A to 8C show a configuration example of a transistor that is used as a gate control device.

FIGS. 9A and 9B show a configuration example of an input buffer of an I/O buffer.

DESCRIPTION OF EXEMPLARY EMBODIMENTS

Figure 1:
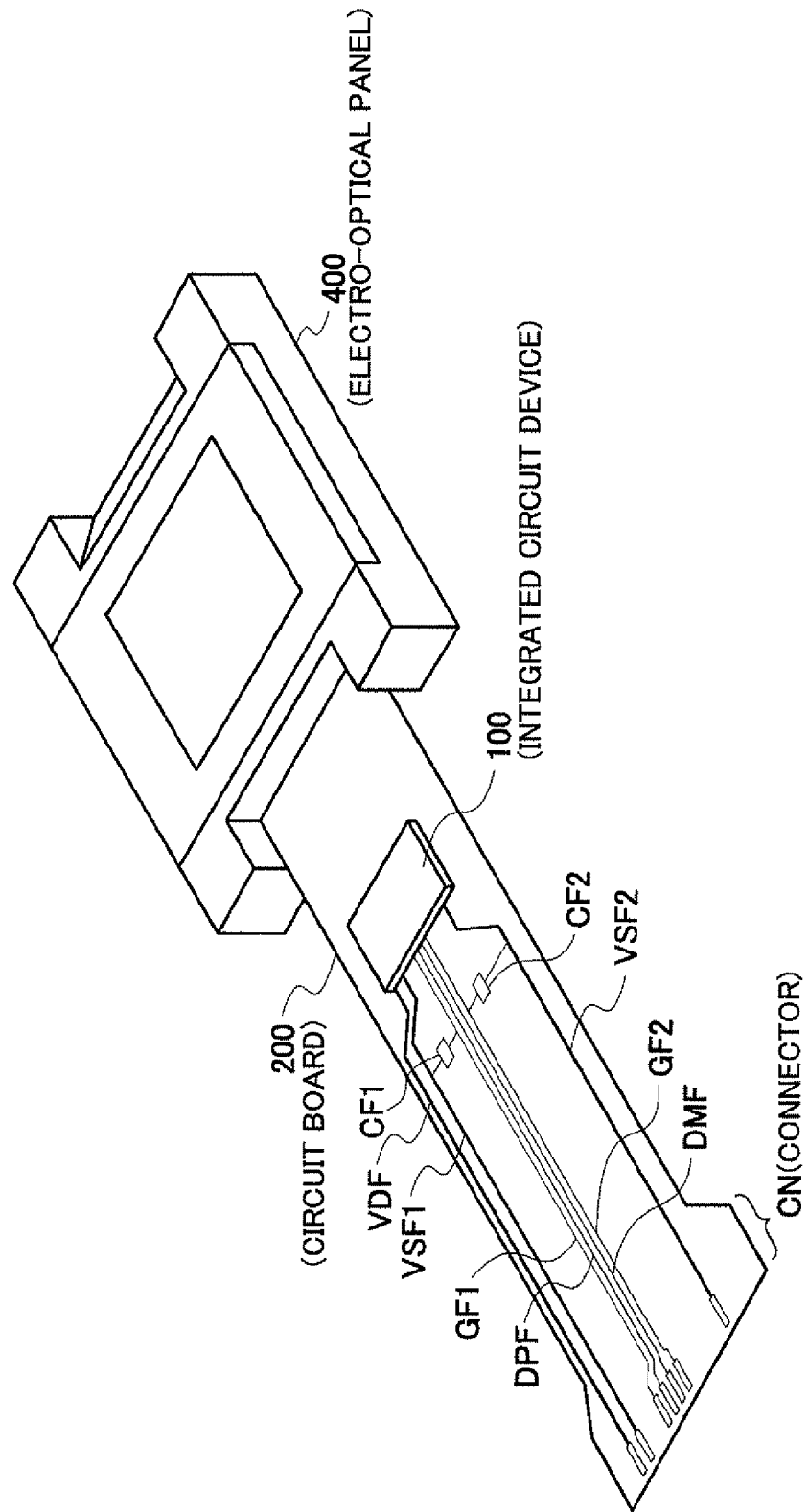
FIG. 1 shows a configuration example of an electro-optical device according to one embodiment of the invention.

Several aspects of the invention may provide an integrated circuit device, an electro-optical device, an electronic instrument, and the like that can suppress undesirable electromagnetic radiation generated from a serial bus. Several aspects of the invention may provide an integrated circuit device, an electro-optical device, an electronic instrument, and the like that enable terminals to be shared in a high-speed serial interface mode (circuit) and a parallel interface mode (circuit).

According to one embodiment of the invention, there is provided an integrated circuit device comprising:

a high-speed serial interface circuit that includes a receiver circuit that receives differential signals through a serial bus;

a first guard terminal that prevents radiation;

a second guard terminal that prevents radiation;

a first terminal that is disposed between the first guard terminal and the second guard terminal and receives a first signal of the differential signals;

a second terminal that is disposed between the first guard terminal and the second guard terminal and receives a second signal of the differential signals;

a first power supply terminal, a high-voltage-side power supply voltage of the receiver circuit being supplied to the first power supply terminal; and a second power supply terminal, a low-voltage-side power supply voltage being supplied to the second power supply terminal, a first switch element being provided between a line from the first guard terminal and a line from the second power supply terminal, and a second switch element being provided between a line from the second guard terminal and a line from the second power supply terminal, the first switch element and the second switch element being turned ON in a high-speed serial interface mode.

According to this embodiment, a switch is provided in the integrated circuit device, and the guard line and the ground line of the serial bus can be connected through the switch. This prevents a situation in which undesirable electromagnetic radiation increases due to the parasitic resistance of the guard line. Moreover, since the integrated circuit device is provided with measures against undesirable electromagnetic radiation, the number of parts required for a circuit board for taking measures against undesirable electromagnetic radiation can be reduced.

In the integrated circuit device may further comprise:

a parallel interface circuit, the first switch element and the second switch element may be turned OFF and a plurality of parallel interface signals may be input to the parallel interface circuit through the first terminal, the second terminal, the first guard terminal, and the second guard terminal in a parallel interface mode.

According to this configuration, the terminals can be shared in the high-speed serial interface mode and the parallel interface mode while suppressing undesirable electromagnetic radiation in the high-speed serial interface mode.

In the integrated circuit device, the first switch element may be formed by a first transistor, the second switch element may be formed by a second transistor, and the high-voltage-side power supply voltage from the first power supply terminal may be input to gates of the first transistor and the second transistor.

According to this configuration, the power supply voltage for the receiver circuit of the high-speed serial interface circuit is used to control the transistor that suppresses radiation. This enables the interface to be switched without adding a control terminal while sharing the terminals.

In the integrated circuit device may further comprise:

a terminating resistor provided between the first terminal and the second terminal, the first transistor and the second transistor may have an on-resistance equal to or lower than a resistance of the terminating resistor.

This enables undesirable electromagnetic radiation to be suppressed more effectively.

In the integrated circuit device, the first transistor and the second transistor may be used as electrostatic discharge protection transistors.

According to this configuration, since an electrostatic discharge protection transistor need not be separately provided, the cost of the integrated circuit device can be reduced.

In the integrated circuit device, the electrostatic discharge protection transistors may be gate control devices.

According to this configuration, the transistor can be used as an undesirable electromagnetic radiation prevention transistor and an electrostatic discharge protection transistor.

In the integrated circuit device may further comprise:

a first input buffer, a first parallel interface signal among the plurality of parallel interface signals being input to the first input buffer from the first terminal; and a second input buffer, a second parallel interface signal among the plurality of parallel interface signals being input to the second input buffer from the second terminal, the first input buffer and the second input buffer may output a signal at a fixed level in the high-speed serial interface mode based on the high-voltage-side power supply voltage supplied to the first power supply terminal.

According to this embodiment a signal is not input to a logic circuit that is provided in the subsequent stage of the parallel interface circuit in the high-speed serial interface mode. This reduces current consumption. Moreover, the input buffer can be controlled without additionally providing a control terminal by utilizing the power supply voltage for the receiver circuit.

In the integrated circuit device may further comprise:

an inverter that operates using a power supply voltage differing from the high-voltage-side power supply voltage, the high-voltage-side power supply voltage supplied to the first power supply terminal may be input to the inverter, and the first input buffer and the second input buffer may be controlled based on an output from the inverter According to this configuration, the input buffer can be controlled by utilizing the power supply voltage for the receiver circuit.

In the integrated circuit device, the first switch element may be formed by a first transistor, the second switch element may be formed by a second transistor, and the low-voltage-side power supply voltage may be supplied to the first power supply terminal and may be input to gates of the first transistor and the second transistor through the first power supply terminal in the parallel interface mode.

According to this configuration, the interface can be switched by utilizing the power supply voltage for the receiver circuit.

According to another embodiment of the invention, there is provided an integrated circuit device comprising:

a high-speed serial interface circuit that includes a receiver circuit that receives differential signals through a serial bus;

a first guard terminal that prevents radiation;

a second guard terminal that prevents radiation;

a first terminal that is disposed between the first guard terminal and the second guard terminal and receives a first signal of the differential signals;

a second terminal that is disposed between the first guard terminal and the second guard terminal and receives a second signal of the differential signals;

a first power supply terminal, a high-voltage-side power supply voltage of the receiver circuit being supplied to the first power supply terminal;

a second power supply terminal, a low-voltage-side power supply voltage being supplied to the second power supply terminal;

a first switch element provided between a line from the first guard terminal and a line from the second power supply terminal;

a second switch element provided between a line from the second guard terminal and a line from the second power supply terminal;

a first I/O buffer that receives and outputs a parallel interface signal through the first guard terminal; and a second I/O buffer that receives and outputs a parallel interface signal through the second guard terminal, the first switch element and the second switch element being turned ON and outputs of the first I/O buffer and the second I/O buffer being set at a low-voltage-side level or set in a high impedance state in a high-speed serial interface mode.

According to this embodiment, the terminals can be shared in the high-speed serial interface mode and the parallel interface mode. This makes it possible to provide an integrated circuit device that enables selection of the interface without increasing the number of terminals. According to this embodiment, the interface is switched using the voltage supplied to the power supply terminal VDDA. This enables selection of the interface without additionally providing a terminal and a signal.

According to this embodiment, the switch is provided in the integrated circuit device, and the guard line and the ground line of the serial bus can be connected through the switch. This prevents a situation in which undesirable electromagnetic radiation increases due to the parasitic resistor of the guard line. Moreover, since the integrated circuit device is provided with measures against undesirable electromagnetic radiation, the number of parts required for a circuit board for taking measures against undesirable electromagnetic radiation can be reduced.

In the integrated circuit device, each of the first I/O buffer and the second I/O buffer may include an input buffer, an output buffer, and a logic circuit, the logic circuit may be provided in a preceding stage of the output buffer, and may output a signal at a fixed level in the high-speed serial interface mode based on the high-voltage-side power supply voltage from the first power supply terminal, and the output buffer may output the low-voltage-side level when the signal at the fixed level has been input to the output buffer from the logic circuit.

This implements an I/O buffer that enables the interface to be switched.

In the integrated circuit device, each of the first I/O buffer and the second I/O buffer may include an input buffer, an output buffer, and a logic circuit, the logic circuit may output a signal at a fixed level in the high-speed serial interface mode based on the high-voltage-side power supply voltage, and an output of the output buffer may be set in the high impedance state based on the signal at the fixed level from the logic circuit.

This also implements an I/O buffer that enables the interface to be switched.

According to another embodiment of the invention, there is provided an electro-optical device comprising:

one of the above integrated circuit devices;

an electro-optical panel; and a circuit board, the circuit board including a first line connected to the first terminal, a second line connected to the second terminal, a first guard line connected to the first guard terminal, a second guard line connected to the second guard terminal, a first power supply line connected to the first power supply terminal, and a second power supply line connected to the second power supply terminal, the first line and the second line being provided between the first guard line and the second guard line.

According to this embodiment, an electro-optical device that suppresses an increase in undesirable electromagnetic radiation generated from a serial bus can be implemented.

In the electro-optical device, the second power supply line may have a line resistance (a parasitic resistance of the second power supply line) lower than those of the first guard line and the second guard line.

This enables an increase in undesirable electromagnetic radiation to be suppressed effectively.

According to another embodiment of the invention, there is provided an electronic instrument comprising one of the above electro-optical devices.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Electro-optical Device

FIG. 1 shows a configuration example of an electro-optical device according to one embodiment of the invention. An integrated circuit device according to this embodiment may be applied to the configuration example shown in FIG. 1. The configuration example shown in FIG. 1 is used for a display section of a projector, for example. The integrated circuit device is connected to an electronic circuit board provided in the projector through a connector CN. Note that the integrated circuit device according to this embodiment may also be applied to a display section of another electronic instrument (e.g., portable telephone).

The electro-optical device according to this embodiment shown in FIG. 1 includes an electro-optical panel 400 (display panel), a circuit board 200, and a driver 100 (integrated circuit device). The electro-optical panel 400 may be implemented by an active matrix liquid crystal panel using a TFT, for example. The electro-optical panel 400 may also be implemented by a liquid crystal panel other than the active matrix liquid crystal panel, or an organic electroluminescence (EL) panel. The circuit board 200 may be implemented by a printed circuit board (e.g., flexible circuit board). Lines (e.g., power supply lines and signal lines) connected to the electro-optical panel 400 and the driver 100 are formed on the circuit board 200. The driver 100 is mounted on the circuit board 200. The driver 100 receives signals through the lines formed on the circuit board 200, and drives the electro-optical panel 400.

Specifically, a ground line VSF1 (second power supply line) is provided on the circuit board 200 as a line that supplies power to the driver 100. A power supply line VDF (first power supply line) is provided on the circuit board 200 as a line that supplies power to a high-speed serial interface circuit of the driver 100. A plurality of ground lines may be provided. In the configuration example shown in FIG. 1, two ground lines VSF1 and VSF2 are provided. A first line DPF, a second line DMF, a first guard line GF1, and a second guard line GF2 are provided on the circuit board 200 as lines that transmit signals to the driver 100. The lines DPF and DMF are provided between the guard lines GF1 and GF2.

The driver 100 performs communication using a display information processing circuit 720 (see FIG. 13) and a high-speed serial interface circuit described later, for example. The driver 100 receives differential signals through the lines DPF and DMF. A ground voltage (fixed voltage in a broad sense) is applied to the guard lines GF1 and GF2 from the electronic circuit board of the projector through the connector CN.

The driver 100 can also perform communication using a parallel interface circuit. In this case, an interface circuit of the driver 100 may include an I/O buffer, and may transmit and receive CMOS-level signals through the lines GF1, DPF, DMF, and GF2.

When the driver 100 can deal with a high-speed serial interface mode and a parallel interface mode, the interface can be selected corresponding to the desired transmission rate and the like. In this case, the number of terminals can be reduced by utilizing a single terminal as a serial bus terminal and a CMOS-level signal terminal.

However, when the terminals are shared in the high-speed serial interface mode and the parallel interface mode, the I/O buffer of the parallel interface circuit is connected to the guard line of the serial bus in the high-speed serial interface mode. Therefore, it is necessary to switch the output of the I/O buffer corresponding to the high-speed serial interface mode and the parallel interface mode.

In the high-speed serial interface mode, undesirable electromagnetic radiation is generated from the lines DPF and DMF when transmitting the differential signals. In recent years, it is necessary to suppress undesirable electromagnetic radiation in the high-speed serial interface design due to an increase in transmission rate. In Japan, electronic instruments such as projectors must be compliant with the VCCI standard and the like. Therefore, it is necessary to take effective measures against the undesirable electromagnetic radiation source such as the high-speed serial interface circuit.

Therefore, a guard line that suppresses undesirable electromagnetic radiation is provided in the serial bus utilized by the high-speed serial interface circuit. In the configuration example shown in FIG. 1, the guard lines GF1 and GF2 are provided. The guard lines GF1 and GF2 are fixed at the ground voltage to absorb undesirable electromagnetic radiation from the lines DPF and DMF.

However, the guard line has a parasitic resistor due to a line provided on a printed circuit board, for example. Therefore, absorption of undesirable electromagnetic radiation by the guard line may be hindered so that undesirable electromagnetic radiation from the serial bus may increase.

2. High-Speed Serial/Parallel Interface Switch Circuit

Figure 2:
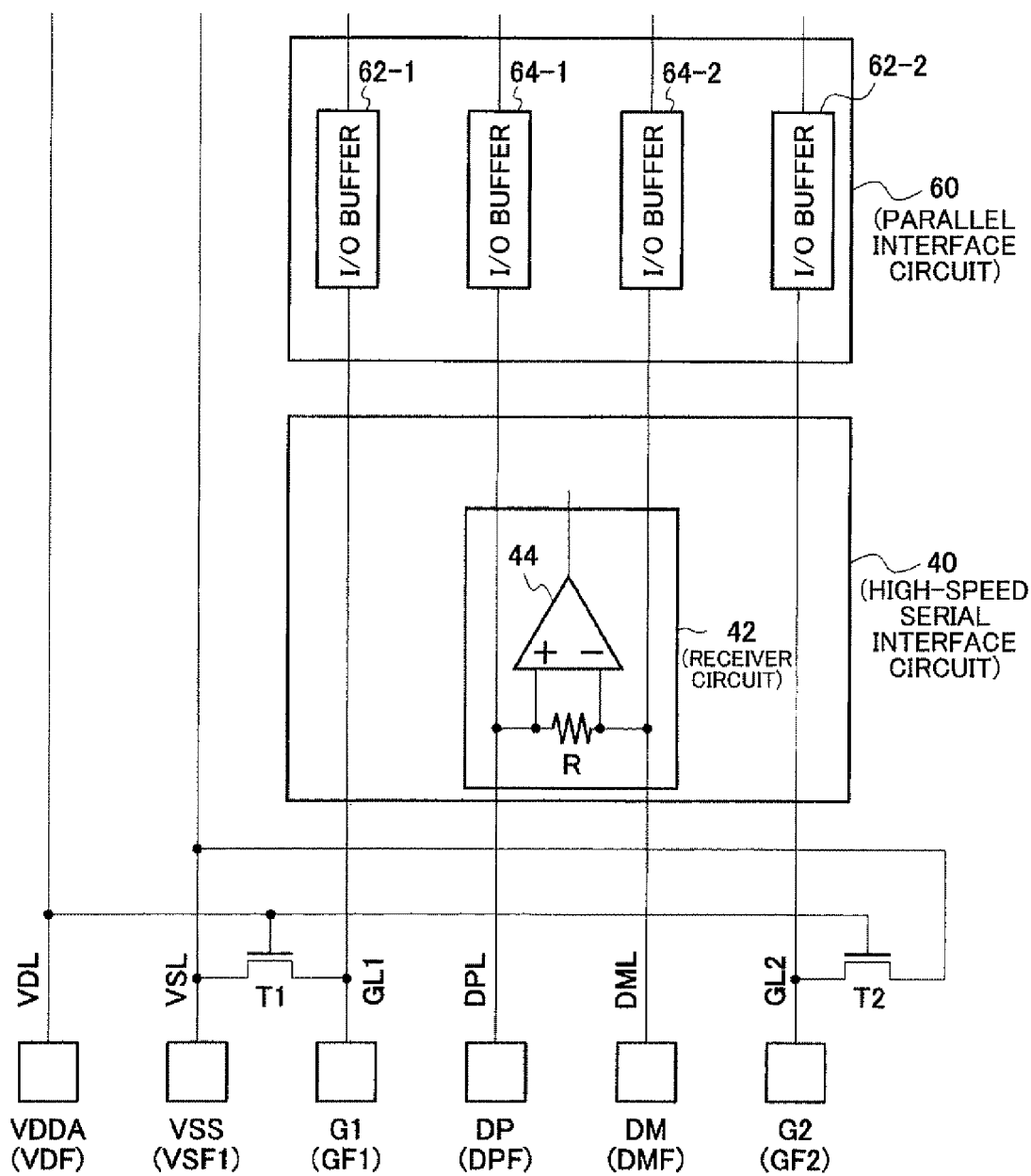
FIG. 2 shows a configuration example of an integrated circuit device according to one embodiment of the invention.

FIG. 2 shows a configuration example of the integrated circuit device according to this embodiment that can solve the above-described problems. The integrated circuit device according to this embodiment includes a first guard terminal G1, a second guard terminal G2, a first terminal DP, and a second terminal DM. The terminals DP and DM are disposed between the guard terminals G1 and G2.

Specifically, the guard terminals G1 and G2 prevent radiation in the high-speed serial interface mode. A first signal that makes up the differential signals is input to the terminal DP, and a second signal that makes up the differential signals is input to the terminal DM. The differential signals are input to the terminals DP and DM through the lines DPF and DMF shown in FIG. 1. The guard terminals G1 and G2 are connected to the guard lines GF1 and GF2 shown in FIG. 1 and are fixed at the ground voltage. In the parallel interface mode, CMOS-level signals are input to the terminals DP, DM, G1, and G2 through the lines DPF, DMF, GF1, and GF2 shown in FIG. 1.

The integrated circuit device according to this embodiment includes a high-speed serial interface circuit 40, a first power supply terminal VDDA, and a second power supply terminal VSS. The high-speed serial interface circuit 40 includes a receiver circuit 42 that receives the differential signals through the serial bus. The power supply terminal VDDA is a terminal to which a power supply voltage (high-voltage-side power supply voltage) for the receiver circuit 42 is supplied. The power supply line VDF shown in FIG. 1 is connected to the power supply terminal VDDA. The ground terminal VSS (second power supply terminal) is a terminal to which the ground voltage (low-voltage-side power supply voltage) is supplied. The ground line VSF1 is connected to the ground terminal VSS. A ground terminal connected to the ground line VSF2 may be provided in addition to the ground terminal VSS.

For example, the receiver circuit 42 may include a terminating resistor R and a differential amplifier 44, as shown in FIG. 2. The terminating resistor R is provided between a line DPL from the terminal DP and a line DML from the terminal DM. A voltage generated across the terminating resistor R due to the differential signals input to the terminals DP and DM is input to the differential amplifier 44.

The integrated circuit device according to this embodiment shown in FIG. 2 also includes a parallel interface circuit 60. The parallel interface circuit 60 includes I/O buffers 62-1, 62-2, 64-1, and 64-2. In the parallel interface mode, the I/O buffers 62-1 and 62-2 receive and output CMOS-level signals through the terminals G1 and G2, and the I/O buffers 64-1 and 64-2 receive and output CMOS-level signals through the terminals DP and DM. In the high-speed serial interface mode, the outputs of the I/O buffers 62-1 and 62-2 are set at the ground voltage (low-voltage-side level) or set in a high impedance state. Therefore, the terminals can be shared by the high-speed serial interface circuit 40 and the parallel interface circuit 60. The I/O buffers 64-1 and 64-2 may be set in a high impedance state in the high-speed serial interface mode. The I/O buffers 64-1 and 64-2 can be set in a high impedance state in the same manner as the I/O buffers 62-1 and 62-2.

In this embodiment, first and second switch elements are provided in order to suppress undesirable electromagnetic radiation from the serial bus. For example, the first and second switch elements may be formed by first and second transistors T1 and T2 shown in FIG. 2. Specifically, the transistor T1 is provided between a line GL1 from the guard terminal G1 and a line VSL from the ground terminal VSS, and the transistor T2 is provided between a line GL2 from the guard terminal G2 and the line VSL from the ground terminal VSS. In the high-speed serial interface mode, the transistors T1 and T2 are turned ON so that the guard lines GF1 and GF2 are connected to the ground line VSF1 through the transistors T1 and T2. This suppresses a problem in which undesirable electromagnetic radiation increases due to the line resistances of the guard lines GF1 and GF2.

3. I/O Buffer 3.1. First Configuration Example

FIGS. 3A and 3B show a first configuration example of the I/O buffer 62-1. The following description is given taking the I/O buffer 62-1 as an example. Note that the configuration of the I/O buffer 62-2 is the same as that of the I/O buffer 62-1.

The I/O buffer 62-1 shown in FIGS. 3A and 3B includes an input buffer BI, an output buffer BQ, and a logic circuit. The logic circuit is provided in the preceding stage of the output buffer BQ, and may include an AND circuit ANA and an inverter INA.

In the high-speed serial interface mode (FIG. 3A), the logic circuit outputs a low-potential-side level (fixed level in a broad sense) based on the power supply voltage for the receiver circuit 42 supplied to the power supply terminal VDDA. Specifically, the power supply voltage for the receiver circuit 42 is input to the inverter INA. Specifically, since a voltage corresponding to a high-potential-side level (H) is input to the inverter INA, the inverter WA outputs the low-potential-side level (L). The output from the inverter INA and an output signal DQ are input to the AND circuit ANA. The AND circuit ANA outputs the low-potential-side level (L) regardless of the output signal DQ. The output buffer BQ receives the output from the AND circuit ANA, and outputs the low-potential-side level (L).

In the parallel interface mode (FIG. 3B), the ground voltage is supplied to the power supply terminal VDDA. This is because the power supply voltage for the receiver circuit 42 is unnecessary in the parallel interface mode. In this case, since a voltage corresponding to the low-potential-side level (L) is input to the inverter INA, the inverter INA outputs the high-potential-side logic level (H). Therefore, the AND circuit ANA outputs the output signal DQ, and the output buffer BQ outputs the output signal DQ to the line GF1 through the terminal G1.

Figure 5:
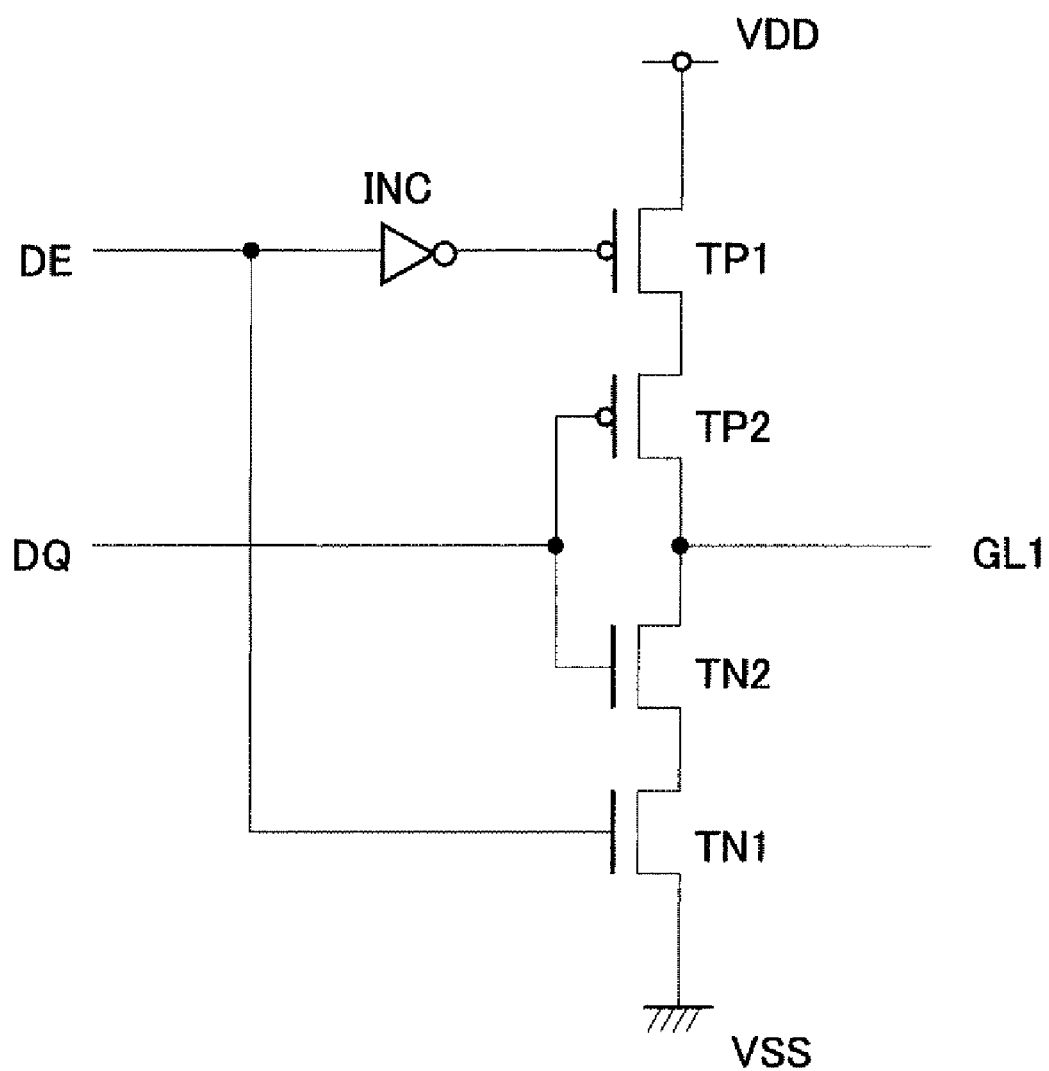
FIG. 5 shows a configuration example of an output buffer of an I/O buffer.

The I/O buffer 62-1 is I/O-controlled using an output enable signal DE. For example, when the output enable signal DE is active, the output buffer BQ performs the operation described with reference to FIGS. 3A and 3B. When the output enable signal DE is inactive, the output buffer BQ is set in a high impedance state, and a CMOS-level signal is input to the input buffer BI through the terminal G1. The output buffer BQ may be formed by a clocked inverter (see FIG. 5), for example.

3.2. Second Configuration Example

Figure 4:
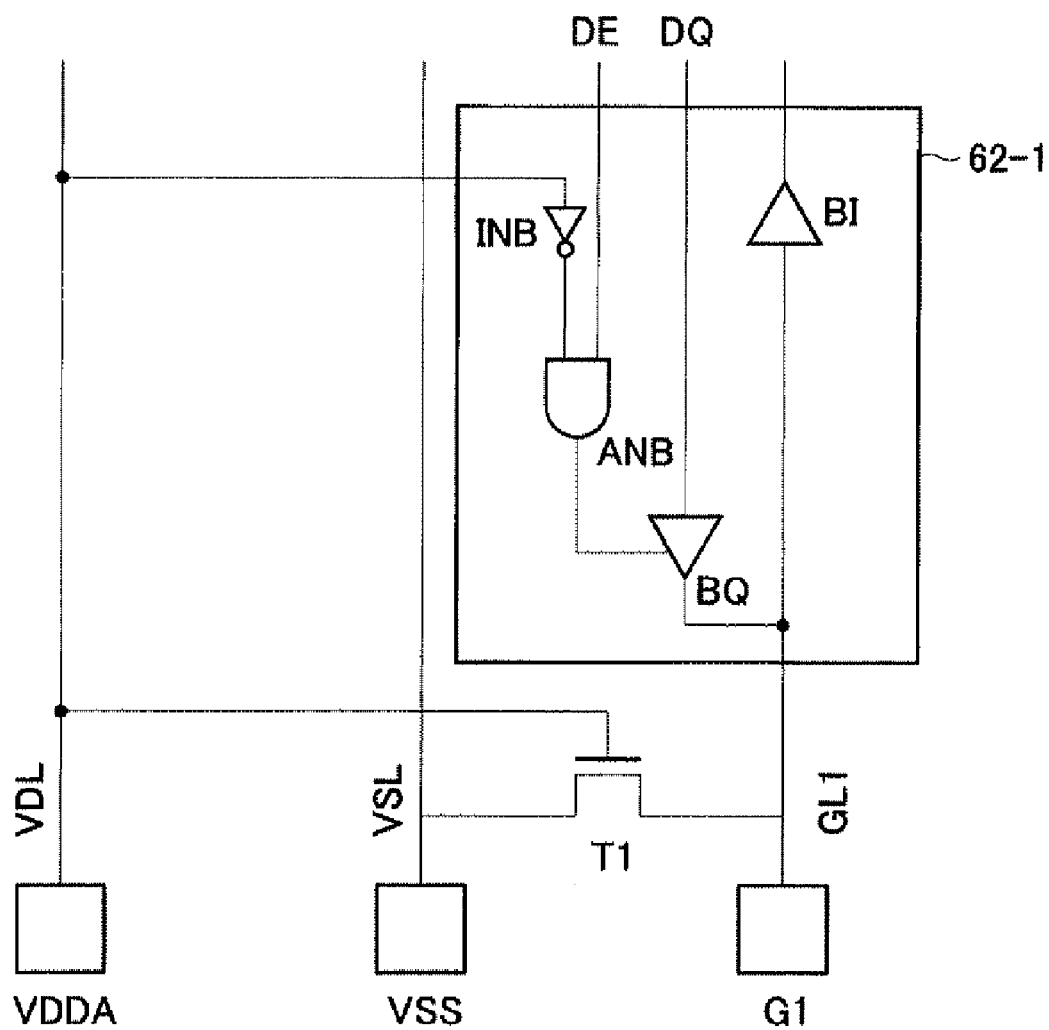
FIG. 4 shows a second configuration example of an I/O buffer.

FIG. 4 shows a second configuration example of the I/O buffer 62-1. The I/O buffer 62-1 according to the second configuration example includes the input buffer BI, the output buffer BQ, an inverter INB, and an AND circuit ANB. The output from the inverter INB and the output enable signal DE are input to the AND circuit ANB. The output signal DQ is input to the output buffer BQ.

Specifically, the inverter INB outputs the low-potential-side level in the high-speed serial interface mode. The AND circuit ANB that has received the low-potential-side level outputs the low-potential-side level (fixed level in a broad sense) regardless of the output enable signal DE. The output of the output buffer BQ is set in a high impedance state based on the output from the AND circuit ANB.

The inverter INB outputs the high-potential-side level in the parallel interface mode. The AND circuit ANB that has received the high-potential-side level outputs the output enable signal DE. The output of the output buffer BQ is set in a high impedance state, or the output buffer BQ outputs the output signal DQ based on the output from the AND circuit ANB. For example, when the output enable signal DE is active, the output buffer BQ outputs the output signal DQ. When the output enable signal DE is inactive, the output of the output buffer BQ is set in a high impedance state, and a CMOS-level signal is input to the input buffer BI through the terminal G1.

When the terminals are shared in the high-speed serial interface mode and the parallel interface mode, it is necessary to switch the output of the I/O buffer.

According to the first and second configuration examples, the terminals can be shared in the high-speed serial interface mode and the parallel interface mode. Therefore, the high-speed serial interface circuit and the parallel interface circuit can be integrated without additionally providing a terminal. This makes it possible to provide an integrated circuit device that enables the interface to be selected while suppressing an increase in cost.

According to this embodiment, the interface is switched using the voltage supplied to the power supply terminal VDDA. This enables the interface to be switched without additionally providing a terminal and a signal used to control the I/O buffer.

4. Transistors T1 and T2

The operation of the transistors T1 and T2 according to this embodiment shown in FIG. 2 is described below with reference to FIGS. 6A and 6B. FIGS. 6A and 6B show connection between each terminal and each line on the circuit board when applying the integrated circuit device according to this embodiment shown in FIG. 2 to the electro-optical device according to this embodiment shown in FIG. 1. Specifically, the lines DPF and DPM are connected to the terminals DP and DM, the guard lines GF1 and GF2 are connected to the guard terminals G1 and G2, and the ground line VSF1 is connected to the ground terminal VSS. The connection state of the power supply terminal VDDA can be changed corresponding to the mode, as shown in FIGS. 6A and 6B. The transistor T1 is provided between the line GL1 from the terminal G1 and the line VSL from the terminal VSS, and the transistor T2 is provided between the line GL2 from the terminal G2 and the line VSL from the terminal VSS.

The transistors T1 and T2 are provided in order to suppress undesirable 15 electromagnetic radiation from the serial bus, as described above. The transistors T1 and T2 may be formed by CMOS transistors, for example. Specifically, the gates of the transistors T1 and T2 are connected to a line VDL from the power supply terminal VDDA so that the voltage supplied to the power supply terminal VDDA is input to the gates of the transistors T1 and T2.

Specifically, the power supply terminal VDDA is connected to the power supply line VDF in the high-speed serial interface mode, as shown in FIG. 6A. Since the power supply voltage for the receiver circuit 42 is supplied to the power supply line VDF, the voltage of the line VDL from the power supply terminal VDDA corresponds to the power supply voltage for the receiver circuit 42. In this case, a high-voltage-side logic level (first logic level in a broad sense) is input to the gates of the transistors T1 and T2 from the line VDL so that the transistors T1 and T2 are turned ON. Therefore, since the lines GL1 and GL2 from the guard terminals G1 and G2 are connected to the line VSL from the ground terminal VSL, the guard lines GF1 and GF2 are connected to the ground line VSF1 through the transistors T1 and T2.

In the parallel interface mode (FIG. 6B), the power supply terminal VDDA is connected to the ground line VSF1 so that the ground voltage (low-voltage-side power supply voltage) is supplied to the power supply terminal VDDA. This is because the power supply voltage for the receiver circuit 42 is unnecessary in the parallel interface mode. In this case, a low-voltage-side logic level (second logic level in a broad sense) is input to the gates of the transistors T1 and T2 from the line VDL so that the transistors T1 and T2 are turned OFF. Therefore, since the guard lines GF1 and GF2 are not connected to the ground line VSF1, CMOS-level signals can be input to the terminals G1 and G2.

In the high-speed serial interface mode, absorption of undesirable electromagnetic radiation may be hindered by the parasitic resistor of the guard line so that undesirable electromagnetic radiation may increase.

On the other hand, since the integrated circuit device according to this embodiment enables the guard line to be connected to the ground line through the transistor in the high-speed serial interface modem, the guard ground voltage can be enhanced using the power supply ground line. Therefore, the resistance between the guard line and the ground voltage can be reduced so that an increase in undesirable electromagnetic radiation can be prevented.

Figure 7:
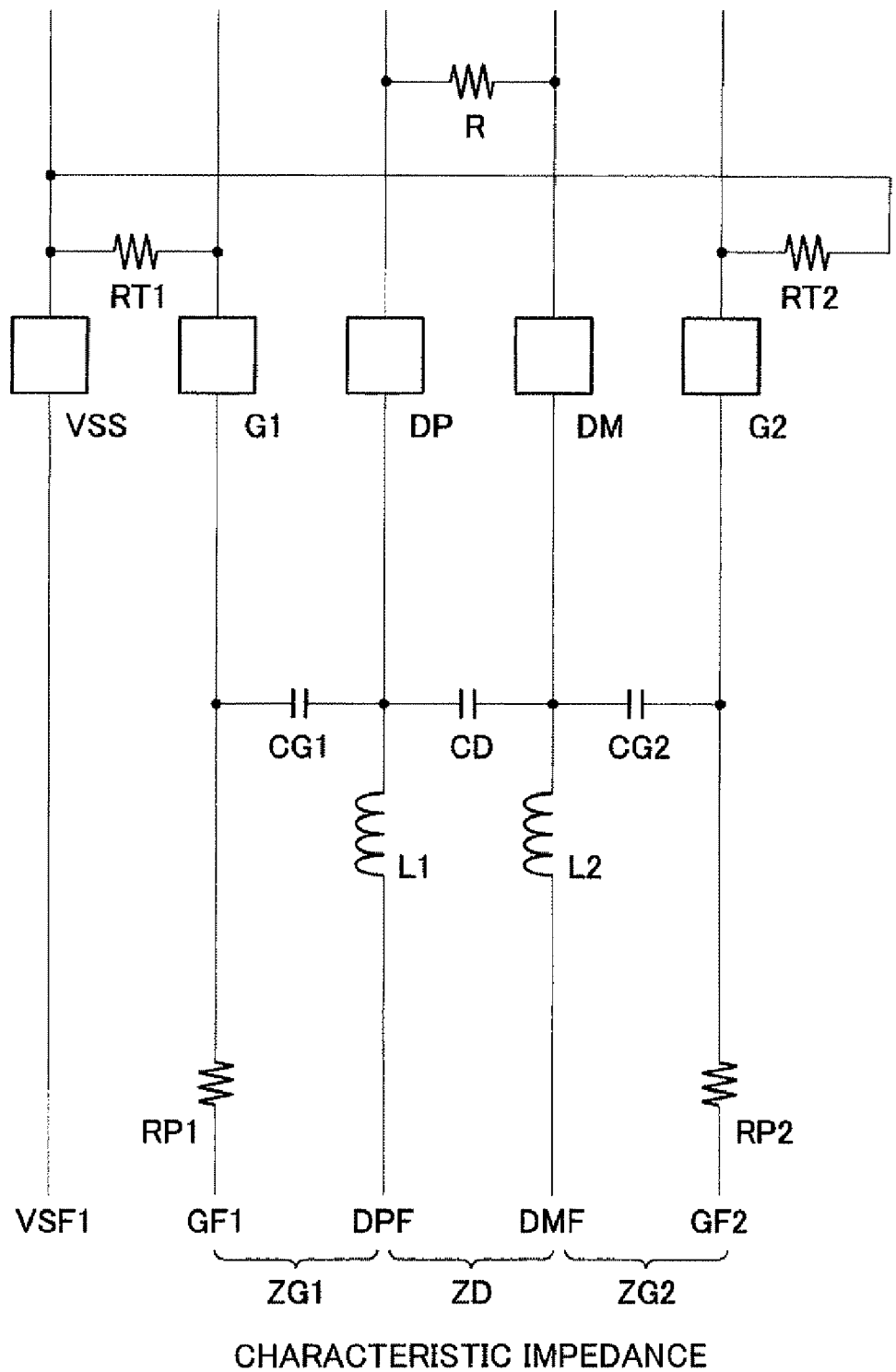
FIG. 7 is a view illustrative of a serial bus.

The details are described below with reference to FIG. 7. FIG. 7 schematically shows the serial bus according to this embodiment when used in the high-speed serial interface mode shown in FIG. 6A.

Specifically, the lines DPF and DMF, the guard lines GF1 and GF2, and the ground line VSF1 are provided on the circuit board 200 shown in FIG. 1. The lines DPF and DMF form transmission lines through a line-to-line capacitor and line inductances. In FIG. 7, the line-to-line capacitor and the line inductances are simply indicated by a line-to-line capacitor CD and line inductances L1 and L2. The guard lines GF1 and GF2 are provided on either side of the transmission lines. A capacitor CG1 indicates the coupling capacitor between the lines GF1 and DPF, and a capacitor CG2 indicates the coupling capacitor between the lines GF2 and DPF. The guard lines GF1 and GF2 are connected to the ground line VSF1 through on-resistances RP1 and RP2 of the transistors T1 and T2 shown in FIG. 6A. A resistor R indicates the terminating resistor R of the receiver circuit 42 shown in FIG. 2. The differential signals are input to the ends of the resistor R through the transmission lines.

The guard lines GF1 and GF2 are fixed at the ground voltage through the connector CN shown in FIG. 1 to absorb undesirable electromagnetic radiation from the lines DPF and DMF, as described above. In FIG. 7, the differential signals are transmitted to the guard lines as voltage noise through the coupling capacitors CG1 and CG2 so that undesirable electromagnetic radiation is absorbed by the guard lines GF1 and GF2.

When the transistors T1 and T2 are not provided, the voltage noise transmitted to the guard lines GF1 and GF2 is absorbed into ground through the connector CN. In this case, if the guard lines GF1 and GF2 are maintained at the ground voltage, the voltage noise has been sufficiently absorbed (i.e., undesirable electromagnetic radiation generated by the differential signals has been sufficiently absorbed by the guard lines GF1 and GF2). However, since the guard lines GF1 and GF2 respectively have the parasitic resistors RP1 and RP2, absorption of the voltage noise is hindered. In this case, undesirable electromagnetic radiation is absorbed by the guard lines GF1 and GF2 to a small extent as compared with the case where the guard lines GF1 and GF2 are maintained at the ground voltage. As a result, undesirable electromagnetic radiation generated from the serial bus increases.

According to this embodiment, since the transistors T1 and T2 are provided, the resistances of the guard lines GF1 and GF2 with respect to ground decreases due to the on-resistances RT1 and RT2. Specifically, the ground line VSF1 has a line resistance lower than those of the guard lines GF1 and GF2. Therefore, the resistances of the guard lines GF1 and GF2 with respect to ground can be reduced to a large extent by providing the transistors T1 and T2. As a result, the guard lines GF1 and GF2 can absorb the voltage noise to a large extent as compared with the case where the transistors T1 and T2 are not provided so that undesirable electromagnetic radiation generated from the serial bus can be reduced.

For example, undesirable electromagnetic radiation can be further suppressed by setting the on-resistances RT1 and RT2 of the transistors T1 and T2 to be equal to or lower than the resistance of the terminating resistor R of the receiver circuit 42. The details are described below.

The resistance of the terminating resistor R shown in FIG. 7 is set to be equal to a characteristic impedance ZD of the transmission lines formed by the lines DPF and DMF in order to efficiently receive the differential signals. The guard line GF1 and the line DPF also form a transmission line through the coupling capacitor CG1 and the inductance L1. The characteristic impedance of the transmission line formed by the guard line GF1 and the line DPF is referred to as ZG1. Likewise, the guard line GF2 and the line DMF form a transmission line. The characteristic impedance of the transmission line formed by the guard line GF2 and the line DMF is referred to as ZG2. Since the distance between the guard line GF1 and the line DPF and the distance between the guard line GF2 and the line DMF are almost equal to the distance between the lines DPF and DMF, the characteristic impedances ZG1 and ZG2 are almost equal to the characteristic impedance ZD. Therefore, the characteristic impedances ZG1 and ZG2 are almost equal to the resistance of the terminating resistor R.

The differential signals are respectively input to the transmission lines having the characteristic impedances ZG1 and ZG2 through the lines DPF and DMF. In this case, if the on-resistances RT1 and RT2 are set to be lower than the characteristic impedances ZG1 and ZG2, the amplitude of the voltage noise transmitted to the guard lines GF1 and GF2 can be made smaller than the voltage amplitude of the lines DPF and DMF. Specifically, since the characteristic impedances ZG1 and ZG2 are almost equal to the resistance of the terminating resistor R, undesirable electromagnetic radiation can be suppressed by setting the on-resistances RT1 and RT2 to be lower than the resistance of the terminating resistor R.

According to this embodiment, an increase in undesirable electromagnetic radiation in the high-speed serial interface mode can be prevented. This implements a reduction in cost of an instrument that utilizes the high-speed serial interface, for example.

When the serial bus is provided on the circuit board over a long path, for example, undesirable electromagnetic radiation tends to increase. Specifically, the amount of undesirable electromagnetic radiation increases as the length of the differential signal transmission line increases, and the parasitic resistance increases as the length of the guard line increases. Therefore, when the serial bus must be provided over a long path, it is necessary to additionally provide a filter component or the like so that cost increases.

According to this embodiment, an increase in undesirable electromagnetic radiation can be suppressed even when a long serial bus is provided. The parasitic resistance increases near the connection section between the interface circuit and the serial bus due to a long distance from the connector of the circuit board. However, the effect of the guard line is maintained even at the end of the serial bus by appropriately designing the interface circuit. Therefore, since a filter component or the like need not be provided on the circuit board, cost can be reduced. Moreover, since the serial bus can be provided without increasing the cost required to take measures against undesirable electromagnetic radiation, the degree of freedom when designing an electronic instrument is increased.

An active element (e.g., IC) outputs a high-speed serial interface signal that directly generates undesirable electromagnetic radiation. However, undesirable electromagnetic radiation is generated from a line on a circuit board in the actual situation. Therefore, when the electronic instrument manufacturer purchases an IC that includes a high-speed serial interface circuit from the IC manufacturer and mounts the IC on a circuit board, for example, the electronic instrument manufacturer must design the circuit board while taking account of measures against undesirable electromagnetic radiation.

According to this embodiment, since measures against undesirable electromagnetic radiation are incorporated in the integrated circuit device, a burden imposed on the electronic instrument manufacturer due to the circuit board design can be reduced. Therefore, the IC manufacturer can supply an IC that includes a high-speed serial interface circuit and can be easily mounted on a circuit board.

In this embodiment, measures against undesirable electromagnetic radiation are taken by connecting the guard line to the ground line using the transistor In this case, when the terminals are shared in the high-speed serial interface mode and the parallel interface mode, it is usually necessary to additionally provide a signal and a terminal used to control the transistor.

According to this embodiment, however, the transistor is ON/OFF-controlled using the power supply voltage for the receiver circuit 42. Therefore, the terminals can be shared in the high-speed serial interface mode and the parallel interface mode. Moreover, since the power supply terminal VDDA and the line VDL can be effectively utilized, the cost of the integrated circuit device can be reduced as compared with the case of additionally providing a signal and a terminal.

Coupling capacitors CF1 and CF2 may be respectively provided between the guard line and the ground line, as shown in FIG. 1. This further reduces the impedance of the guard line so that undesirable electromagnetic radiation can be suppressed.

5. Use of Transistors T1 and T2 as GCD

The transistors T1 and T2 according to this embodiment described with reference to FIG. 2 and the like may be used as electrostatic discharge protection transistors. For example, the transistors T1 and T2 may be used as electrostatic discharge protection transistors that serve as gate control devices.

The details are described below with reference to FIGS. 8A to 8C. The following description focuses on the transistor T1 since the transistors T1 and T2 have an identical configuration.

FIG. 8A shows an example of a gate control device (GCD). A transistor TGC (i.e., gate control device) is provided between the line from the terminal G1 and the ground terminal VSS. The ground voltage from the ground terminal is input to the gate of the transistor TGC. For example, when a pulse voltage lower than the ground voltage is applied to the terminal G1, the pulse voltage is applied between the gate and the source (or drain) of the transistor TGC so that the transistor TGC is turned ON. Since the pulse voltage is released to ground through the transistor TGC, a situation in which the pulse voltage is applied to the integrated circuit device can be prevented.

FIGS. 8B and 8C show the transistor T1 according to this embodiment. The line from the power supply terminal VDDA is connected to the gate of the transistor T1, as described with reference to FIG. 2 and the like.

In the parallel interface mode (FIG. 8B), the power supply terminal VDDA is connected to the ground line VSF1 on the circuit board 200. Specifically, since the gate of the transistor T1 is connected to the source (or drain) of the transistor T1 through the line VSF1, a connection relationship equivalent to that of the gate control device shown in FIG. 8A is achieved.

In the high-speed serial interface mode (FIG. 8C), the power supply terminal VDDA is connected to the power supply line VDF on the circuit board 200. In this case, if the power supply voltage for the receiver circuit 42 is supplied to the power supply terminal VDDA, a pulse voltage that is lower than the ground voltage and applied to the terminal G1 can be released to ground in the same manner as the gate control device shown in FIG. 8A. An electrostatic breakdown tends to occur when mounting the integrated circuit device on the circuit board. In this case, the voltage of the terminal VDDA is considered to be equal to the voltage of the terminal VSS as compared with a pulse voltage that causes an electrostatic breakdown. Therefore, a pulse voltage can be released to ground in the same manner as the gate control device shown in FIG. 8A.

According to this embodiment, the transistors T1 and T2 can thus be used as electrostatic discharge protection transistors. Therefore, the area of the integrated circuit device can be reduced as compared with the case of providing a transistor that suppresses undesirable electromagnetic radiation separately from an electrostatic discharge protection transistor.

6. Configuration Example of Input Buffer of I/O Buffer

FIGS. 9A and 9B show a configuration example of the input buffer of the I/O buffer. FIGS. 9A and 9B show only the input buffers applied to the I/O buffers 62-1, 62-2, 64-1, and 64-2 of the parallel interface circuit 60 for convenience of description. When the parallel interface circuit 60 only receives CMOS-level signals, the parallel interface circuit 60 may be formed by the input buffers shown in FIGS. 9A and 9B.

The parallel interface circuit 60 shown in FIGS. 9A and 9B includes first and second input buffers BFP and BFM. The signals from the terminals DP and DM are respectively input to the input buffers BFP and BFM. The parallel interface circuit 60 may include an inverter INV that receives the voltage from the terminal VDDA. The parallel interface circuit 60 may include input buffers BF1 and BF2 that receive the signals from the terminals G1 and G2. The terminal VDD is set at a power supply voltage differing from the power supply voltage for the receiver circuit 42 supplied from the terminal VDDA. The input buffers BFP, BFM, BF1, and BF2 and the inverter INV operate using the power supply voltage supplied from the terminal VDD.

Specifically, the input buffers BFP and BFM may be formed by AND circuits. The outputs from the input buffers BFP and BFM are controlled by the output from the inverter INV, and determined based on the voltage supplied from the terminal VDDA.

In the high-speed serial interface mode (FIG. 9A), the power supply voltage for the receiver circuit 42 is supplied to the terminal VDDA, and the inverter INV outputs a low-voltage-side logic level (L). Therefore, the input buffers BFP and BFM output signals at a low-voltage-side logic level (L; fixed level in a broad sense). Since the terminals G1 and 62 are fixed at the ground voltage through the guard lines, the outputs from the input buffers BF1 and BF2 are fixed at the low-voltage-side logic level.

In the parallel interface mode (FIG. 9B), the ground voltage is supplied to the terminal VDDA since the power supply voltage for the receiver circuit 42 is unnecessary. In this case, since the inverter INV outputs a high-voltage-side logic level (H), the input buffers BFP and BFM respectively buffer and output CMOS-level signals input through the terminals DP and DM. Since CMOS-level signals (first and second parallel interface signals) are input to the terminals G1 and G2 in the parallel interface mode, the input buffers BF1 and BF2 respectively buffer and output CMOS-level signals input through the terminals G1 and G2.

In this embodiment, the terminals are shared in the high-speed serial interface mode and the parallel interface mode. In this case, the input buffer of the parallel interface circuit may buffer a high-speed serial interface signal in the high-speed serial interface mode so that current consumption may increase.

According to this embodiment, however, since the input buffer outputs the fixed voltage in the high-speed serial interface mode based on the voltage supplied to the terminal VDDA, an increase in current consumption can be prevented. Specifically, a situation in which a high-frequency signal buffered by the input buffer is input to a logic circuit provided in the subsequent stage of the parallel interface circuit so that current is consumed by the logic circuit that is not used in the high-speed serial interface mode can be prevented. Moreover, the interface can be switched without additionally providing a control terminal and a control signal by utilizing the power supply voltage for the receiver circuit 42 for the above-described control.

7. High-Speed Serial Interface Circuit

Figure 10:
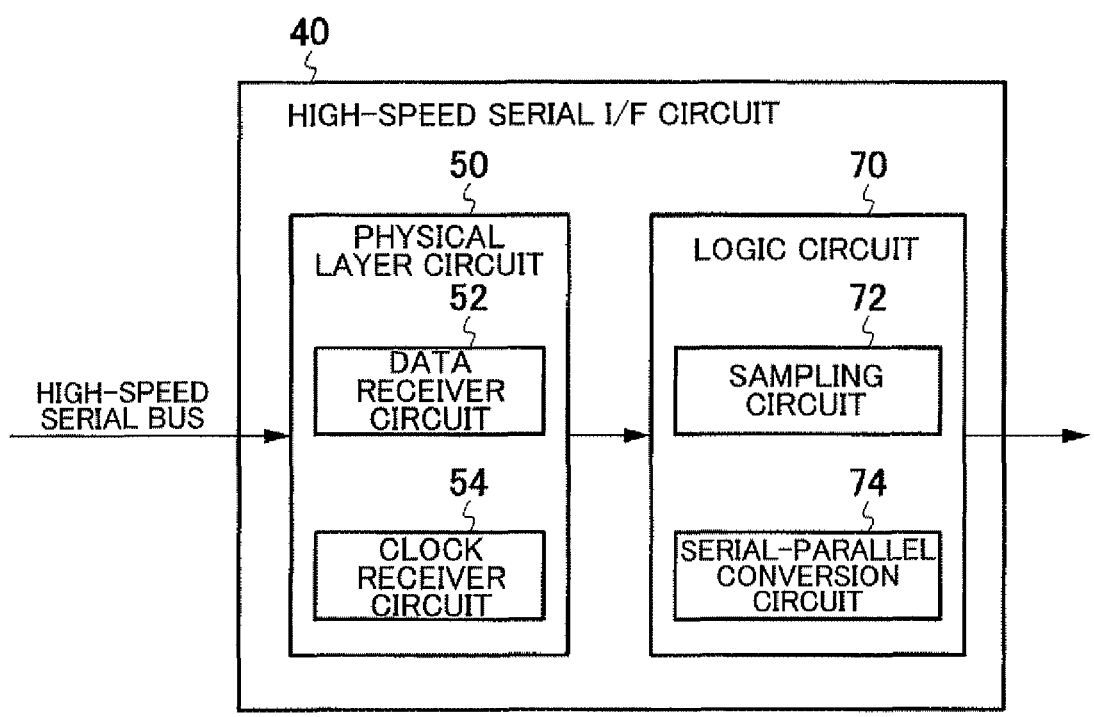
FIG. 10 shows a configuration example of a high-speed serial interface circuit.

FIG. 10 shows a specific configuration example of the high-speed serial interface circuit 40. The high-speed serial interface circuit 40 includes a physical layer circuit 50 and a logic circuit 70.

The physical layer circuit 50 (receiver) is a circuit that receives data (packets) and a clock signal using differential signals (differential data signals and differential clock signals). Specifically, the physical layer circuit 50 receives data through the current-driven or voltage-driven differential signal lines of the serial bus. The physical layer circuit 50 may include a data receiver circuit 52, a clock receiver circuit 54, and the like. The data receiver circuit 52 and the clock receiver circuit 54 correspond to the receiver circuit 42 according to this embodiment. The physical layer circuit 50 may also include a transmitter circuit. In this case, the physical layer circuit 50 transmits data and a clock signal.

The logic circuit 70 interfaces between the high-speed serial interface circuit 40 and the internal circuit of the driver. Specifically, the logic circuit 70 may include a sampling circuit 72 and a serial-parallel conversion circuit 74. The sampling circuit 72 samples a data signal from the data receiver circuit 52 using a clock signal from the clock receiver circuit 54, and generates serial data. The serial-parallel conversion circuit 74 converts the serial data into parallel data, and outputs the parallel data to the internal circuit of the driver. The logic circuit 70 may also include a link controller that performs a process of a link layer that is an upper layer of the physical layer.

8. Specific Configuration Example of Electro-Optical Device

Figure 11:
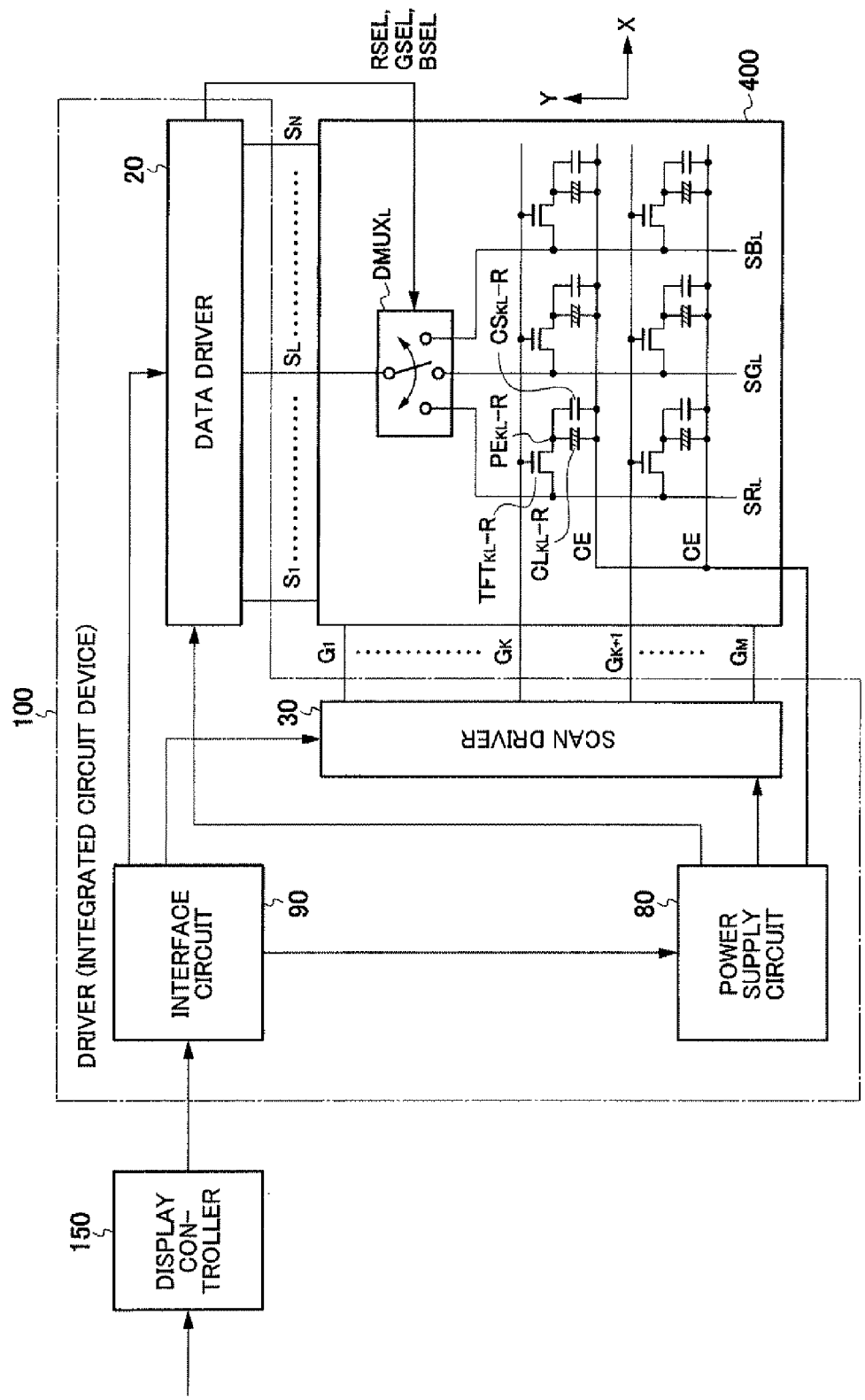
FIG. 11 shows a specific configuration example of an electro-optical device according to one embodiment of the invention.

FIG. 11 shows a specific configuration example of the electro-optical device according to this embodiment. FIG. 11 shows an example in which this embodiment is applied to a liquid crystal display device. Note that this embodiment may also be applied to a display device using a light-emitting element (e.g., EL element).

A liquid crystal display device (electro-optical device or display device) according to this embodiment shown in FIG. 11 includes a liquid crystal panel 400 (electro-optical panel or display panel), a data driver 20 (data line driver circuit), a scan driver 30 (scan line driver circuit or gate driver), a power supply circuit 80, and a display controller 150. The interface switch circuit according to this embodiment shown in FIG. 2 is included in an interface circuit 90. Note that the liquid crystal display device according to this embodiment need not necessarily include all of these circuit blocks. The liquid crystal display device according to this embodiment may have a configuration in which some of the circuit blocks are omitted.

The liquid crystal panel 400 is formed on an active matrix substrate (e.g., glass substrate), for example. Thin film transistors TFTKL-R, TFTKL-G, and TFTKL-B are provided on the active matrix substrate at positions corresponding to the intersections of a gate line GK ($1 \leq K \leq M$; K and M are natural numbers) and data lines SRL, SGL, and SBL ($1 \leq L \leq N$; L and N are natural numbers).

For example, the gate of the thin film transistor TFTKL-R is connected to the gate line GK, and the source and the drain of the thin film transistor TFTKL-R are connected to the data line SRL and a pixel electrode PEKL-R. A liquid crystal (electro-optical substance) is interposed between the pixel electrode PEKL-R and a common electrode CE so that a liquid crystal capacitor CLKL-R and an auxiliary capacitor CSKL-R are formed.

Data voltage supply lines S1 to SN are provided on the active matrix substrate, and demultiplexers are provided corresponding to the data voltage supply lines S1 to SN. A demultiplexer DMUXL supplies grayscale voltages supplied to the source voltage supply line SL by time division to the data lines SRL, SGL, and SBL based on a multiplex control signal supplied from the data driver 20.

The voltage level of a common electrode voltage VCOM applied to the common electrode CE is generated by a common electrode voltage generation circuit included in the power supply circuit 80. The common electrode CE is formed over the entire common substrate, for example.

The data driver 20 drives the data voltage supply lines S1 to SN of the liquid crystal panel 400 based on grayscale data. Since the demultiplexer separates the grayscale voltages, the data driver 20 can drive the data lines SR1 to SRN, SG1 to SGN, and SB1 to SBN. The scan driver 30 scans (sequentially drives) scan lines G1 to GM of the liquid crystal panel 400.

The display controller 150 outputs control signals supplied to the data driver 20, the scan driver 30, and the power supply circuit 80 to the interface circuit 90 based on information set by a host (not shown) such as a central processing unit (CPU).

The interface circuit 90 supplies the control signals input from the display controller 150 to the data driver 20, the scan driver 30, and the power supply circuit 80.

The power supply circuit 80 generates various voltage levels (grayscale voltages) necessary for driving the liquid crystal panel 400 and the voltage level of the common electrode voltage VCOM applied to the common electrode CE based on a reference voltage supplied from the outside.

In FIG. 11, the liquid crystal display device includes the display controller 150. Note that the display controller 150 may be provided outside the liquid crystal display device. Some or all of the data driver 20, the scan driver 30, the power supply circuit 80, and the display controller 150 may be formed on the liquid crystal panel 400.

8.1. Data Driver

Figure 12:
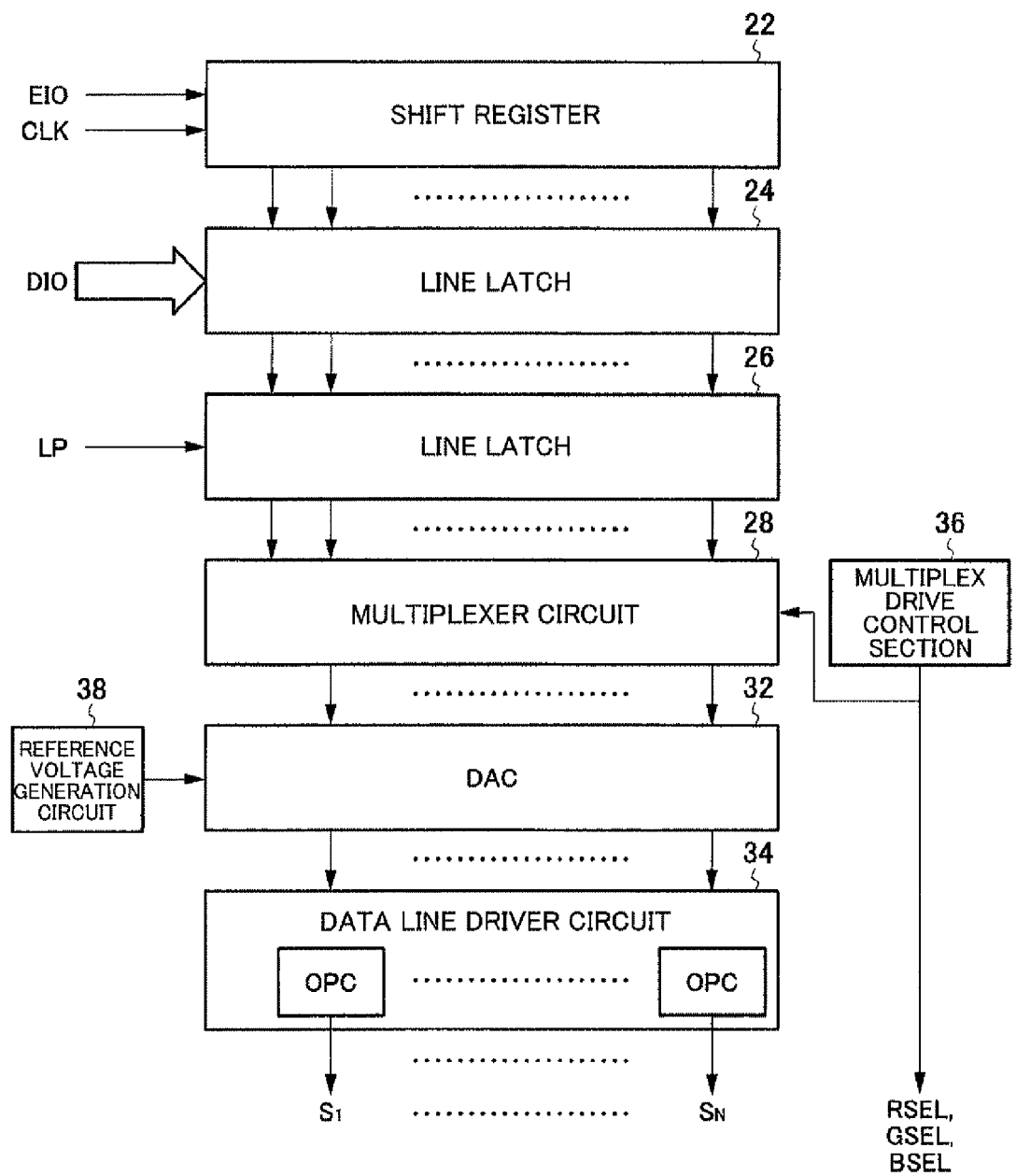
FIG. 12 shows a configuration example of a data driver.

FIG. 12 shows a configuration example of the data driver 20 shown in FIG. 11. The data driver 20 includes a shift register 22, line latches 24 and 26, a multiplexer circuit 28, a reference voltage generation circuit 38, a DAC 32 (data voltage generation circuit), a data line driver circuit 34, and a multiplex drive control section 36.

The shift register 22 sequentially shifts an enable input-output signal EIO to adjacent flip-flops in synchronization with a clock signal CLK.

The line latch 24 receives grayscale data DIO from the display controller 150 in units of 18 bits (6 bits (grayscale data)×3 (RGB)), for example. The line latch 24 latches the grayscale data DIO in synchronization with the enable input-output signal EIO that is sequentially shifted by the shift register 22.

The line latch 26 latches the grayscale data corresponding to one horizontal scan latched by the line latch 24 in synchronization with a horizontal synchronization signal LP supplied from the display controller 150.

The multiplexer circuit 28 time-division multiplexes the grayscale data corresponding to three data lines latched by the line latch 26 corresponding to each data line.

The multiplex drive control section 36 generates multiplex control signals RSEL, GSEL, and BSEL that specify the time division timing of the grayscale voltages supplied to the data voltage supply line, and sequentially activates the multiplex control signals RSEL, GSEL, and BSEL within one horizontal scan period. The multiplexer circuit 28 multiplexes the grayscale voltages based on the multiplex control signals so that the grayscale voltages are supplied to the data voltage supply line by time division. The multiplex control signals are also supplied to the demultiplexers of the liquid crystal panel 400.

The reference voltage generation circuit 38 generates sixty-four reference voltages, for example. The sixty-four reference voltages generated by the reference voltage generation circuit 38 are supplied to the DAC 32.

The DAC 32 selects one of the reference voltages supplied from the reference voltage generation circuit 38 based on the digital grayscale data supplied from the multiplexer circuit 28, and outputs an analog data voltage corresponding to the digital grayscale data to each data line.

The data line driver circuit 34 includes a voltage-follower-connected operational amplifier provided corresponding to each data line. The operational amplifier buffers the data voltage from the DAC 32, and outputs the data voltage to the data line to drive the data line.

In FIG. 12, the digital grayscale data is subjected to digital-analog conversion and output to the data line through the data line driver circuit 34. Note that an analog image signal may be sampled/held and output to the data line through the data line driver circuit 34.

9. Electronic Instrument

Figure 13:
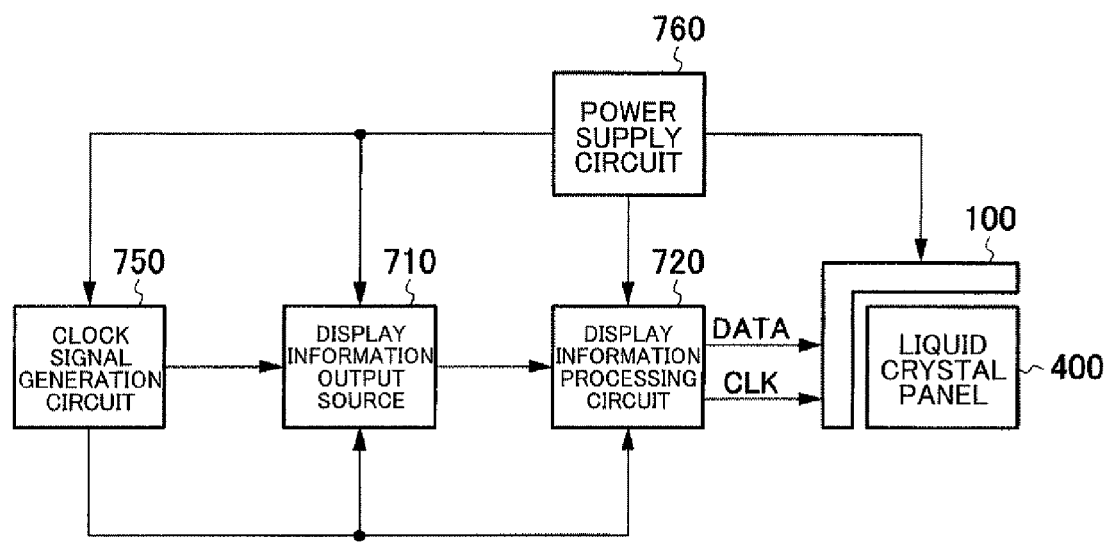
FIG. 13 shows a configuration example of an electronic instrument according to one embodiment of the invention.

A projector (projection-type display device) is one type of electronic instrument formed using the above-described liquid crystal display device. FIG. 13 is a block diagram showing a configuration example of a projector to which the liquid crystal display device according to this embodiment is applied.

A projector shown in FIG. 13 includes a display information output source 710, a display information processing circuit 720, the driver 100 (integrated circuit device), the liquid crystal panel 400 (electro-optical panel), a clock signal generation circuit 750, and a power supply circuit 760. The display information output source 710 includes a memory such as a read-only memory (ROM), a random access memory (RAM), or an optical disk device, and a tuning circuit that tunes and outputs an image signal. The display information output source 710 outputs display information (e.g., an image signal in a given format) to the display information processing circuit 720 based on a clock signal from the clock signal generation circuit 750. The display information processing circuit 720 may include an amplification/polarity inversion circuit, a phase expansion circuit, a rotation circuit, a gamma correction circuit, a clamping circuit, and the like. The driver 100 includes a scan driver and a data driver, and drives the liquid crystal panel 400. The power supply circuit 760 supplies power to each circuit.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., liquid crystal display device, driver, liquid crystal panel, and ground) cited with a different term (e.g., electro-optical device, integrated circuit device, electro-optical panel, and low-potential-side power supply voltage) having a broader meaning or the same meaning at least once in the specification and the drawings can be replaced by the different term in any place in the specification and the drawings. The configurations and the operations of the high-speed serial interface circuit, the parallel interface circuit, the data driver, the scan driver, the power supply circuit, the driver, the electro-optical device, the electronic instrument, and the like are not limited to those described in connection with the above embodiments. Various modifications and variations may be made.

What is claimed is:

1. An integrated circuit device comprising:
 a high-speed serial interface circuit that includes a receiver circuit that receives differential signals through a serial bus;
 a first guard terminal that prevents radiation;
 a second guard terminal that prevents the radiation;
 a first terminal that is disposed between the first guard terminal and the second guard terminal and receives a first signal of the differential signals;
 a second terminal that is disposed between the first guard terminal and the second guard terminal and receives a second signal of the differential signals;

a first power supply terminal, a high-voltage-side power supply voltage of the receiver circuit being supplied to the first power supply terminal; and a second power supply terminal, a low-voltage-side power supply voltage being supplied to the second power supply terminal, a first switch element being provided between a line from the first guard terminal and a line from the second power supply terminal, and a second switch element being provided between a line from the second guard terminal and a line from the second power supply terminal, the first switch element and the second switch element being turned ON in a high-speed serial interface mode.

2. The integrated circuit device as defined in claim 1, further comprising:

a parallel interface circuit, the first switch element and the second switch element being turned OFF and a plurality of parallel interface signals being input to the parallel interface circuit through the first terminal, the second terminal, the first guard terminal, and the second guard terminal in a parallel interface mode.

3. The integrated circuit device as defined in claim 2, the first switch element being formed by a first transistor, the second switch element being formed by a second transistor, and the high-voltage-side power supply voltage from the first power supply terminal being input to gates of the first transistor and the second transistor.

4. The integrated circuit device as defined in claim 3, further comprising:

a terminating resistor provided between the first terminal and the second terminal, the first transistor and the second transistor having an on-resistance equal to or lower than a resistance of the terminating resistor.

5. The integrated circuit device as defined in claim 3, the first transistor and the second transistor being used as electrostatic discharge protection transistors.

6. The integrated circuit device as defined in claim 5, the electrostatic discharge protection transistors being gate control devices.

7. The integrated circuit device as defined in claim 2, further comprising:

a first input buffer, a first parallel interface signal among the plurality of parallel interface signals being input to the first input buffer from the first terminal; and a second input buffer, a second parallel interface signal among the plurality of parallel interface signals being input to the second input buffer from the second terminal, the first input buffer and the second input buffer outputting a signal at a fixed level in the high-speed serial interface mode based on the high-voltage-side power supply voltage supplied to the first power supply terminal.

8. The integrated circuit device as defined in claim 7, further comprising:

an inverter that operates using a power supply voltage differing from the high-voltage-side power supply voltage, the high-voltage-side power supply voltage supplied to the first power supply terminal being input to the inverter, and the first input buffer and the second input buffer being controlled based on an output from the inverter.

9. The integrated circuit device as defined in claim 2, the first switch element being formed by a first transistor, the second switch element being formed by a second transistor, and the low-voltage-side power supply voltage being supplied to the first power supply terminal and being input to gates of the first transistor and the second transistor through the first power supply terminal in the parallel interface mode.

10. An integrated circuit device comprising:

a high-speed serial interface circuit that includes a receiver circuit that receives differential signals through a serial bus;

a first guard terminal that prevents radiation;

a second guard terminal that prevents radiation;

a first terminal that is disposed between the first guard terminal and the second guard terminal and receives a first signal of the differential signals;

a second terminal that is disposed between the first guard terminal and the second guard terminal and receives a second signal of the differential signals;

a first power supply terminal, a high-voltage-side power supply voltage of the receiver circuit being supplied to the first power supply terminal;

a second power supply terminal, a low-voltage-side power supply voltage being supplied to the second power supply terminal;

a first switch element provided between a line from the first guard terminal and a line from the second power supply terminal;

a second switch element provided between a line from the second guard terminal and a line from the second power supply terminal;

a first I/O buffer that receives and outputs a parallel interface signal through the first guard terminal; and a second I/O buffer that receives and outputs a parallel interface signal through the second guard terminal, the first switch element and the second switch element being turned ON and outputs of the first I/O buffer and the second I/O buffer being set at a low-voltage-side level or set in a high impedance state in a high-speed serial interface mode.

11. The integrated circuit device as defined in claim 10, each of the first I/O buffer and the second I/O buffer including an input buffer, an output buffer, and a logic circuit, the logic circuit being provided in a preceding stage of the output buffer, and outputting a signal at a fixed level in the high-speed serial interface mode based on the high-voltage-side power supply voltage from the first power supply terminal, and the output buffer outputting the low-voltage-side level when the signal at the fixed level has been input to the output buffer from the logic circuit.

12. The integrated circuit device as defined in claim 10, each of the first I/O buffer and the second I/O buffer including an input buffer, an output buffer, and a logic circuit, the logic circuit outputting a signal at a fixed level in the high-speed serial interface mode based on the high-voltage-side power supply voltage, and an output of the output buffer being set in the high impedance state based on the signal at the fixed level from the logic circuit.

13. An electro-optical device comprising:

the integrated circuit device as defined in claim 1;

an electro-optical panel; and a circuit board, the circuit board including a first line connected to the first terminal, a second line connected to the second terminal, a first guard line connected to the first guard terminal, a second guard line connected to the second guard terminal, a first power supply line connected to the first power supply terminal, and a second power supply line connected to the second power supply terminal, the first line and the second line being provided between the first guard line and the second guard line.

14. The electro-optical device as defined in claim 13, the second power supply line having a line resistance lower than those of the first guard line and the second guard line.

15. An electronic instrument comprising the electro-optical device as defined in claim 13.

16. An electro-optical device comprising:

the integrated circuit device as defined in claim 10;

an electro-optical panel; and a circuit board, the circuit board including a first line connected to the first terminal, a second line connected to the second terminal a first guard line connected to the first guard terminal, a second guard line connected to the second guard terminal, a first power supply line connected to the first power supply terminal, and a second power supply line connected to the second power supply terminal, the first line and the second line being provided between the first guard line and the second guard line.

17. The electro-optical device as defined in claim 16, the second power supply line having a line resistance lower than those of the first guard line and the second guard line.

18. An electronic instrument comprising the electro-optical device as defined in claim 16.

* * * * *